United States Patent
Beck et al.

[11] 3,774,990
[45] Nov. 27, 1973

[54] VISUAL SIMULATION OPTICAL SYSTEM

[75] Inventors: James C. Beck, La Canada; Harrie W. Nielsen, Pasadena, both of Calif.

[73] Assignee: The Singer Company, Binghamton, N.Y.

[22] Filed: Sept. 29, 1972

[21] Appl. No.: 293,689

[52] U.S. Cl. .................. 350/181, 35/12 N, 350/182
[51] Int. Cl. ............................................. G02b 13/10
[58] Field of Search ........................... 350/181, 182; 35/12 N

[56] References Cited
UNITED STATES PATENTS
3,497,289  2/1970  Oberheuser ......................... 350/182
3,611,590  10/1971  Levy .................................. 35/12 N

*Primary Examiner*—John K. Corbin
*Attorney*—Francis L. Masselle et al.

[57] ABSTRACT

An optical system for distorting an image projected from a film, or the like, to produce simulated viewpoint displacement. The invention improves on the performance of conventional systems using two rotatable fixed anamorphosers in the form of cylindrical lenses by replacing the lens farthest from the film with a rotatable prism system. The latter is optically and mechanically interchangeable with the cylindrical lens which it replaces in present commercial visual systems for aircraft simulations, for example.

2 Claims, 3 Drawing Figures

VISUAL SIMULATION OPTICAL SYSTEM

BACKGROUND OF THE INVENTION

The present invention relates to optical systems for use in vehicle simulator visual displays, and the like. More particularly, the invention is concerned with means to substitute certain optical elements for portions of existing optical systems of this type and thereby improve performance characteristics of the system.

Visual systems are employed with vehicle simulators to present to the operator of the simulator various scenes which would be viewed along a typical vehicular path which is to be visually simulated. A well known and accepted visual system is one which employs a motion picture which contains scenes taken from a vehicle following a typical path, such as an airplane following a well defined approach path to a landing strip. The recorded scenes on the motion picutre frames are distorted by the optics of the visual system in accordance with the simulated excursions of the simulator from the actual viewpoint of the recorded scenes. Such an optical system for altering the apparent perspective of an image is disclosed in U.S. Pat. No. 3,015,988, among others.

The optical system disclosed in the referenced patent utilizes, in a first embodiment, a pair of fixed power cylindrical lenses mounted for independent rotation so that controlled distortion could be imparted to the projected image by selective positioning of the relative angular positions of the axes of magnification of the lenses. In other embodiments, variable power cylindrical anamorphosers are used in combination with one another and with fixed power anamorphic lenses. The most widely used commercial embodiment of this type of visual simulation system corresponds to that shown in FIG. 4 of U.S. Pat. No. 3,611,590 and comprises (listing the optical elements in order of physical location along the optical axis from the one nearest the film) a group of fine focus lenses, an image rotator in the form of a Pechan prism, a zoom-type projection lens, a first fixed power cylindrical lens, a second fixed power cylindrical lens, a pair of so-called pitch wedges, and a decollimating lens group. The first and second cylindrical lenses are mounted for selective rotation to impart controlled distortion simulating viewpoint displacement of the projected image in accordance with the relative angular positions of the magnification axes of the lenses.

In commercial systems, the use of crossed cylindrical anamorphosers to obtain 2.8x squeeze ratio produces objectionable resolution due to field curvature in the second anamorphoser, i.e., the cylindrical lens furthest from the film and projection lens. This anamorphoser operates with an angular field 2.8 times that of the first anamorphoser. The field curvature is in the direction parallel to the cylindrical axis of the anamorphoser. It is desriable to improve resolution, if possible, without rendering obsolete all, or significant parts of, systems presently in commercial use. Prism anamorphosers for the same angular field, anamorphic ratio and pupil position are unreasonably large and will not mechanically interchange with systems presently in commercial use. Other systems of providing controlled distortion, such as Scheimpflug systems, require completely different optics and cannot provide an acceptable retrofit for present commercial systems.

SUMMARY OF THE INVENTION

Accordingly, it is a principal object of the present invention to provide an optical unit which is optically and mechanically interchangeable with a portion of present commercial visual simulation systems in an efficient and economical manner which will improve resolution without introducing other unwanted effects.

The invention utilizes the entire optical train of the most common visual simulation systems presently in commercial use except for the pair of cylindrical anamorphosers which are replaced by a mechanically interchangeable unit containing a first cylindrical anamorphoser and a prism assembly. The first (cylindrical) anamororphoser provides 2.8x squeeze ratio in a compact space and the angular field is not large enough to have objectionable field curvature.

The second (prism) anamorphoser is physically larger than the cylindrical lens, but does not exhibit field curvature at the larger field angle. The combination of the two provides system resolution better than the two cylindrical anamorphosers in present commercial systems while remaining sufficiently compact for commercial application.

DETAILED DESCRIPTION OF THE PREFERRED EMBODIMENT

Figures 1, 2, 3:
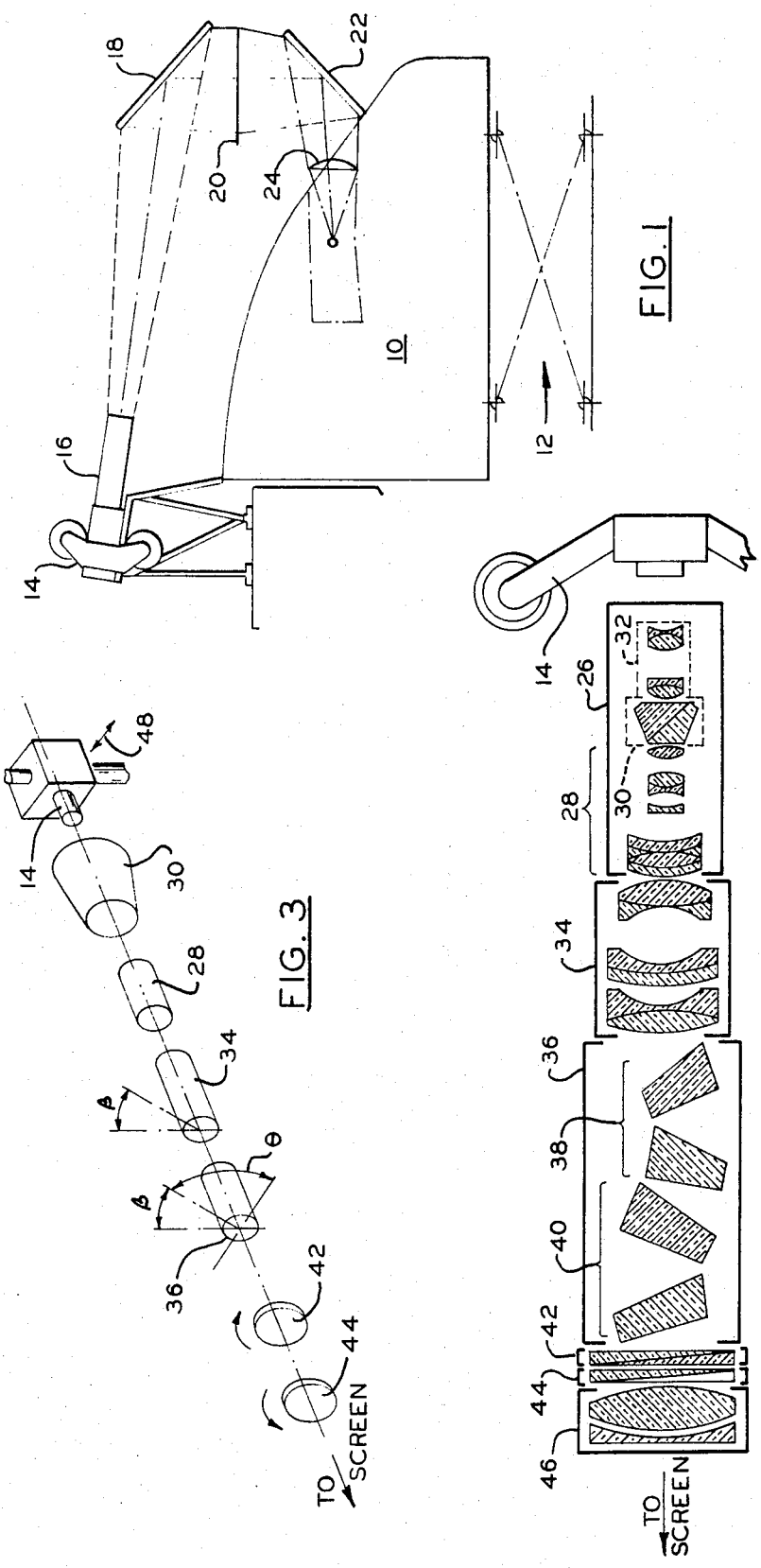
FIG. 1 is a partly diagrammatic, side elevational view of an aircraft simulator an associated visual system mounted thereon.
FIG. 2 is a diagrammatic illustration of the preferred embodiment of the optical system comprising the present invention and used in the visual system of FIG. 1.
FIG. 3 is a diagrammatic illustration of various functions and relationships of the optical elements of FIG. 2.

Referring now to the drawing, a typical aircraft simulator which is employed in conjunction with the present invention is shown in FIG. 1. The simulator is conventional in design and generally comprises cockpit 10 mounted on motion system 12. Projector 14 displays scenes recorded on a film photographed from an airplane following a flight path to be displayed for training purposes.

An optical system 16 provides the necessary alteration in the apparent perspective of the image in accordance with the position of the contols as operated by the student pilot within the cockpit 10. The projected image is displayed to the student pilot by means of a mirror 18, a rear projection screen 20, a mirror 22, and a lens 24.

The optical system 16 for altering the apparent perspective of the image of the scenes recorded on the film is illustrated in FIG. 2. As shown, the optical system 16 includes a first group of optical elements or lenses designated with the reference numeral 26, which form an image rotator and a zoom lens combination. A group of lenses designated with the reference numeral 28 form a variable magnification, variable focal length or zoom lens combination for varying the size of the projected image. A Pechan prism 30 is disposed in front of the zoom lens 28 and permits rotation of the image. A fine focus for the system is provided by a group of lenses 32.

Immediately following the first section 26 is a group of lenses 34 which form a cylindrical anamorphic lens group. Each of the lenses within the group 34 is fixed relative to one another and the entire group is mounted on and for rotation about the axis of optical system 16. A group 36 of four prisms is likewise mounted on and for rotation about the axis of optical system 16 in tandem with the lens group 34. Each of the prisms is fixed relative to one another and the entire group is mounted for rotation about the optical axis. The prisms are arranged in two identical pairs 38 and 40, and are designed and arranged according to known optical techniques to provide a primitive transformation in the same manner as cylindrical anamorphic lens group 34. A pair of pitch wedges 42 and 44 are disposed adjacent to prism group 36 and on the axis of optical system 16, and produce a vertical shifting of the image passing therethrough. A decollimating lens group 46 forms the final group of lenses in optical system 16.

If it is decided to project an image through optical system 16 without distortion, the magnification axes of the anamorphic cylindrical lens group 34 and prism group 36 are disposed orthogonally to one another. If a one-to-one magnification is desired, the zoom lens 28 is conditioned to provide a reduction in the size of the image equal to the amount of enlargement produced by the anamorphic lenses 34 and prisms 36 on the image. In order to produce various effects of motion or changes in viewpoint, various elements of optical system 16 are either translated or rotated accordingly.

In order to provide the effect of a simulated change in heading, projector 14 is translated laterally as indicated by the double-headed arrow designated with the reference numeral 48 in FIG. 3. To provide the effect of a simulated change in the pitch of the aircraft, pitch wedges 42 and 44 are rotated in opposite directions with respect to one another to shift the entire image vertically. To provide the effect of roll, the image rotater Pechan prism 30 is rotated.

To provide the visual effect of movement along the filmed flight path without any horizontal or vertical excursion, the film having the scenes recorded thereon is operated in either forward or a reverse direction to simulate forward or reverse motion respectively. Changes in the speed along the flight path are simulated by changing the speed of the film. In order to provide the visual effect of horizontal, vertical, or a combination of horizontal and vertical excursion the magnification axes of the anamorphic lens group 34 and prism group 36 must be rotationally positioned in accordance with a predetermined relationship, defined according to well-known principles and parameters set forth in full or referenced in the aforementioned U.S. Pats., among others. In addition, because of the rotation of the image produced by the anamorphic lens group 34 and prism group 36 the Pechan prism 30 must be rotated to maintain all horizontal lines in the image parallel to the horizon. Since the total magnification produced by the anamorphic lens group 34 and prism group 36 changes with the changes in position of those lenses, the zoom lens 28 must be conditioned to compensate for that change in magnification.

Accordingly, the optical system illustrated in FIGS. 2 and 3 alters the apparent perspective of an image by the steps of providing two primitive transformations by means of lens group 34 and prism group 36, one spherical magnification by means of zoom lens 28, and rotation of the image by means of the Pechan prism 30. The position of the anamorphic lens 34 is defined by the value of the angle $\beta$, which is the angle between the magnification axis of the anamorphic lens and a vertical line. The position of the prisms 36 is defined by an angle $\Theta$, which is the angle between the magnification axis of anamorphic lens 34 and the magnification axis of prisms 36, all as indicated in FIG. 3.

Arrangement of the prisms in two identical pairs, reversed 180° from one another, serves to equalize distortion on both sides of the field and to bring the center line back to the original axis after displacement by the first prism pair. The mixed cylindrical lens and prism anamorphosers provides an optical system as compact as the prior art systems using two cylindrical lenses, with optical performance (resolution) superior to that of the prior art. Optical design may provide any desired angular field, pupil size and position and anamorphic ratio within prescribed physical limitations. Optical design of the individual elements of prism group 36 may be and preferably is such that the barrel containing the prisms may be mechanically interchanged with the lens barrel holding the second cylindrical lens group in optical systems presently in commercial use. Furthermore, no change whatever is required in the drive signals to the servo which effects rotation of the prism group in accordance with signals commensurate with movement of control members in cockpit 10. That is, the image distortion produced by rotation of prism group 36 may be, and preferably is, exactly the same with respect to the angular orientation of its magnification axis as that produced by the cylindrical lens group which it replaces.

What is claimed is:

1. An optical system providing controlled apparent viewpoint displacement in a projected image visual system for aircraft simulators, and the like, said system comprising, in combination:
   a. a film projector;
   b. an image rotator;
   c. a zoom-type projection lens;
   d. a cylindrical lens having a first magnification axis and mounted for selective rotation;
   e. a prism group having a second magnification axis and mounted for selective rotation relative to said first axis;
   f. a pair of pitch wedges; and
   g. a decollinating lens;
   h. all of said rotator, projection lens, cylindrical lens, prism group, pitch wedges and decollimating lens being mounted on, and defining the optical axis of said projector, in the order recited with said rotator being closest to said projector.

2. The invention according to claim 1 wherein said prism group comprises two pairs of identical prisms rotated 180° with respect to one another.

* * * * *